United States Patent Office 2,922,779
Patented Jan. 26, 1960

2,922,779

PRODUCTION OF GLYCOL DIESTERS OF AROMATIC DICARBOXYLIC ACIDS

James Lincoln and Kenneth Darling Grice, London, England, assignors to British Celanese Limited, a British company No Drawing. Application May 8, 1953
Serial No. 353,888

Claims priority, application Great Britain May 21, 1952

4 Claims. (Cl. 260—75)

This invention relates to improvements in the production of esters and is more particularly concerned with the production of aromatic polyesters and of intermediates therefor.

In U.S. Patent No. 2,551,732, there is described a process for the production of aromatic polyesters from certain aromatic dicarboxylic acids and volatile glycols, which consists in first reacting the sodium or other salt of a dicarboxylic acid with an excess over two molecules of the halogen hydrin of the glycol, separating the sodium or other halide salt formed as a by-product and any unchanged raw materials, if desired working up the reaction product so as to form the pure bis-glycol ester of the dicarboxylic acid and thereafter heating this ester under conditions such that the glycol can evaporate until a polymer of the required molecular weight is produced. The particular aromatic dicarboxylic acids dealt with in the specification are para-dicarboxy derivatives of compounds containing a single benzene ring or 4.4'-dicarboxy derivatives of compounds containing two benzene rings linked together either directly or through carbon, oxygen or sulphur atoms, for example terephthalic acid, 2.5-dichloroterephthalic acid, diphenyl-4.4'-dicarboxylic acid, 3.3'-dimethyl-diphenyl-4.4'-dicarboxylic acid, $\alpha.\omega$-bis-(para-carboxyphenyl)-alkanes, as for example 4.4'-dicarboxy-dibenzyl, and $\alpha.\omega$-bis-(para-carboxyphenoxy)-alkanes, as for example $\alpha.\beta$-bis-(para-carboxyphenoxy)-ethane. The process is also applicable to naphthalene dicarboxylic acids capable of giving high melting polyesters, and in particular 1.5-, 2.6- and 2.7-naphthalene dicarboxylic acids.

All these aromatic dicarboxylic acids are refractory in the sense that they are very difficult to dissolve, which militates against smooth chemical reaction. They all have their carboxy groups linked directly to the aromatic nucleus and the two carboxy groups are separated from each other by at least four carbon atoms in each aromatic nucleus. For the purpose of making high melting polyesters, the preferred acids are those in which the two carboxy groups are linked to the aromatic nucleus in diametrically opposite positions, that is to say in the para position with a single benzene nucleus, in the 4.4'-position with diphenyl compounds, and in the 1.5- and 2.6-positions in the naphthalene nucleus.

In the examples of the said specification the treatment of the sodium or other salt of the dicarboxylic acids with the chlorhydrin of the glycol is carried out in an aqueous medium. We have found that, using a glycol as reaction medium, the reaction may be carried out at a higher temperature than is possible under reflux using an aqueous medium, and the effect is generally to increase the proportion of the salt of the dicarboxylic acid converted to the glycol ester.

Generally we prefer to use reaction temperatures higher than are obtainable at atmospheric pressure with an aqueous medium, for example temperatures of 130° C. up to 170° C. or even higher as, for example, temperatures of 150° C. to 180° C. Ethylene glycol is a very suitable medium for any of these temperatures. However, other volatile glycols, for example trimethylene glycol, may be used. In all cases the reaction may be carried out at atmospheric pressure under reflux. The amount of chlorhydrin or other halogen hydrin used is preferably two molecules for each molecule of the salt of the dicarboxylic acid. However, a small excess, such as 2½ moles or even 3, may be used.

The reaction between the halogen hydrin and the salt of the dicarboxylic acid may be catalysed by secondary bases such as diethylamide or suitable salts such as sodium iodide. Generally, however, the reaction proceeds quite rapidly and smoothly in the absence of catalysts.

At the end of the reaction, any excess halogen hydrin may be removed by distillation and the reaction mixture mixed with ethanol or other suitable liquid to precipitate any unchanged dicarboxylic acid salt and preferably to precipitate the major part of any free dicarboxylic acid formed. After the precipitation step the reaction product is filtered, solvents removed, for example under reduced pressure, and polymerisation carried out in the usual way, for example, using an ester-interchange catalyst.

The following examples illustrate the invention but do not limit it in any way:

Example 1

10.5 parts of sodium terephthalate, 12.08 parts of ethylene chlorhydrin (3 moles to 1 of terephthalate) and 33 parts of ethylene glycol were heated on an oil bath at a temperature of 160–170° C. for 3 hours. At the end of this period absolute ethanol was added to the reaction mixture, which was then filtered. The filtrate was heated first at atmospheric pressure and then at a pressure decreasing to about 8 mms. of mercury so as to remove ethanol, excess ethylene chlorhydrin and glycol. The solid was heated with 50 parts of water while stirring, cooled to 0° and again filtered. The remaining solid was washed with ice-cold water and dried. Its analysis showed it to be mainly the bis-glycol ester of terephthalic acid with some mono-ester and possibly a small amount of free terephthalic acid. It was completely soluble in ethanol and had a melting point ranging from 100 to 250° C. It contained no chlorine.

Example 2

21 parts of sodium terephthalate, 16.1 parts of ethylene chlorhydrin (2 moles to 1 of terephthalate) and 66 parts by weight of ethylene glycol were heated on an oil bath at 160–170° C. for 3 hours. The product was worked up exactly as described in Example 1. The percent conversion from the original sodium terephthalate was of the order of 70%. By working up the solid both from the first filtration and from the filtrate after separating the solid esters and returning the resulting terephthalic acid to the process, a total yield based on the terephthalate of about 96% was obtained.

Example 3

The product of Example 2 was heated at 230° C. in a stream of oxygen-free nitrogen until it was homogeneous, which occupied 1 hour. At this stage a small amount of magnesium ribbon was added, the temperature maintained at 230° C. for a further 2 hours and raised during 1 hour to 280° C. Heating was continued at 280° C. for 5 hours under atmospheric pressure and for a further 5 hours under an absolute pressure of 3 mms. of mercury. The polymer obtained was fibre-forming and had a melting point of 246–249° C.

Example 4

42 parts of sodium terephthalate, 32.2 parts of ethylene chlorhydrin (2 moles per mole of terephthalate) and 133 parts of ethylene glycol were heated on an oil bath at 160–170° C. for 4 hours. The glycol esters of the terephthalic acid were separated as described in Example 1. The conversion here was 68% and the yield on the terephthalate 96%.

Example 5

The product from Example 4 was subjected to the polymerisation schedule set out in Example 3. The product was a fibre-forming polymer having an intrinsic viscosity of 0.45 and was very light in colour.

Exactly similar results may be obtained by using the potassium salt of terephthalic acid instead of the sodium salt. Similarly polymers may be obtained from the sodium or potassium salts of other of the dicarboxylic acids mentioned, for example diphenyl-4.4'-dicarboxylic acid.

Having described our invention, what we desire to secure by Letters Patent is:

1. Process for the production of a glycol diester of an aromatic dicarboxylic acid, each carboxy group in said aromatic dicarboxylic acid being attached to an aromatic nucleus and being separated from the other carboxy group by at least 4 nuclear carbon atoms in each aromatic nucleus of said aromatic acid, which comprises heating a salt selected from the group consisting of sodium and potassium salts of said aromatic dicarboxylic acid with ethylene chlorhydrin in ethylene glycol at 150–180° C. at atmospheric pressure, separating the chloride salt formed by the reaction and removing glycol any any chlorhydrin from the resulting glycol ester of the aromatic acid.

2. Process for the production of di-$\beta$-hydroxyethyl terephthalate, which comprises heating sodium terephthalate with ethylene chlorhydrin in ethylene glycol at 150–180° C. at atmospheric pressure, separating sodium chloride and removing ethylene glycol and any ethylene chlorhydrin from the resulting $\beta$-hydroxyethyl terephthalate.

3. In the production of a fibre-forming polyethylene terephthalate by forming bis-hydroxyethyl-terephthalate by reaction between a salt selected from the group consisting of sodium and potassium salts of terephthalic acid and ethylene glycol chlorhydrin, freeing the diester so obtained from the chloride salt formed, and any unchanged ethylene glycol chlorhydrin, and polymerising the bis-hydroxyethyl-terephthalate so obtained by heating in the presence of an ester interchange catalyst first under atmospheric pressure and finally under a low absolute pressure, the improvement which consists in carrying out the reaction between the terephthalic acid salt and the ethylene glycol chlor-hydrin in a reaction medium consisting of ethylene glycol at a temperature of 150°–180° C. and under atmospheric pressure.

4. Process for the production of di-$\beta$-hydroxyethyl terephthalate, which comprises heating a salt selected from the group consisting of sodium and potassium salts of terephthalic acid with ethylene chlorhydrin in ethylene glycol at 150–180° C. at atmospheric pressure, separating the chloride salt formed by the reaction and removing ethylene glycol and any ethylene chlorhydrin from the resulting $\beta$-hydroxyethyl terephthalate.

References Cited in the file of this patent

UNITED STATES PATENTS

| | | |
|---|---|---|
| 1,943,972 | Izard | Jan. 16, 1934 |
| 2,062,917 | Lawson | Dec. 1, 1936 |
| 2,331,329 | Kyrides | Oct. 12, 1943 |
| 2,465,319 | Whinfield et al. | Mar. 22, 1949 |
| 2,551,732 | Drewitt et al. | May 8, 1951 |